UNITED STATES PATENT OFFICE.

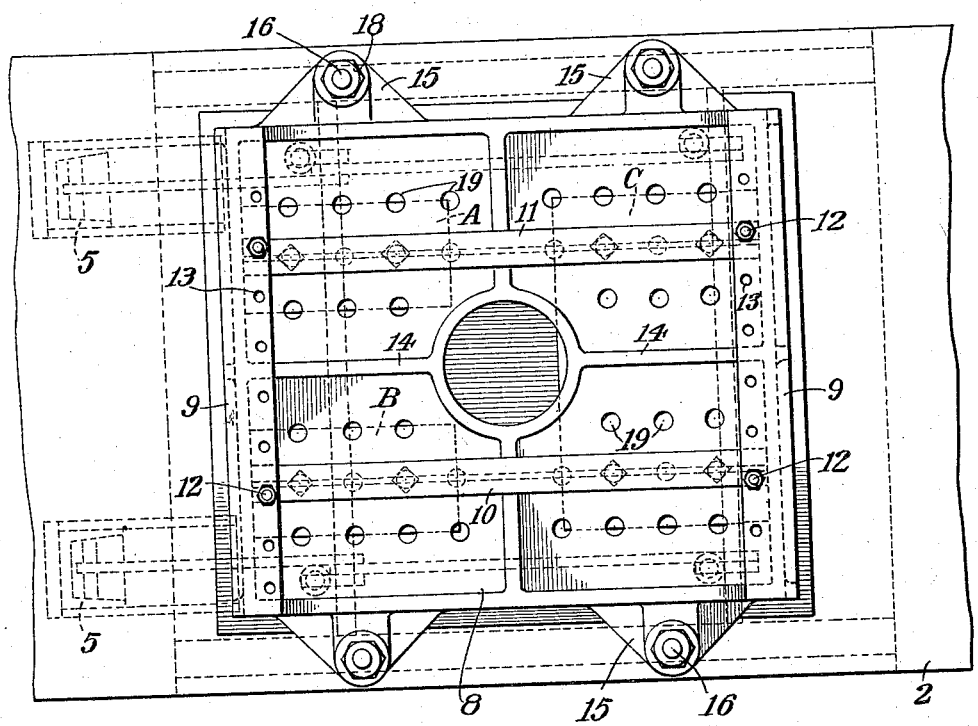
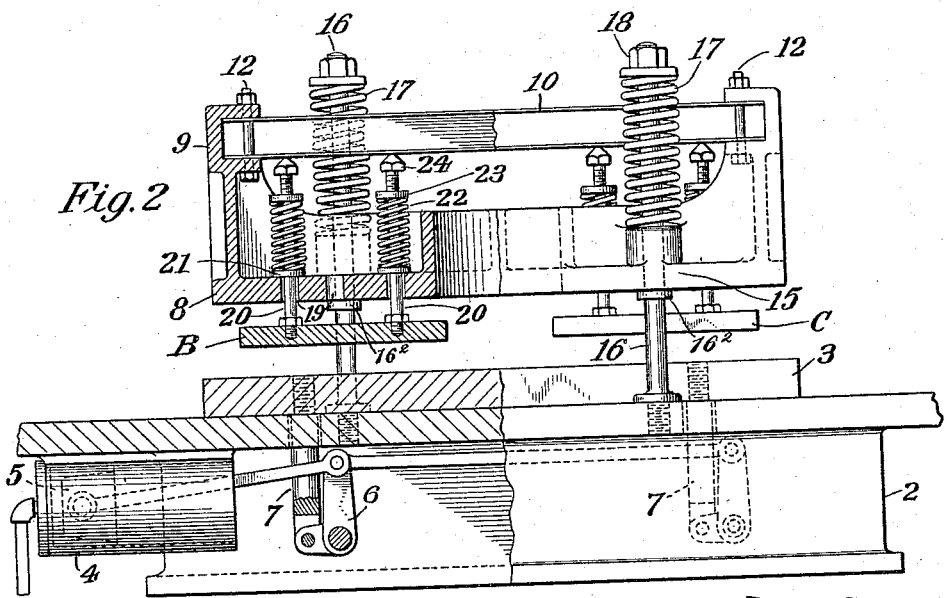

MYRON A. ROSS, OF MORGANTOWN, WEST VIRGINIA, ASSIGNOR TO PRESSED PRISM PLATE GLASS COMPANY, OF MORGANTOWN, WEST VIRGINIA, A CORPORATION OF WEST VIRGINIA.

APPARATUS FOR PRESSING GLASS.

1,149,987.      Specification of Letters Patent.      Patented Aug. 10, 1915.

Application filed November 6, 1914. Serial No. 870,568.

*To all whom it may concern:*

Be it known that I, MYRON A. ROSS, a citizen of the United States, residing in Morgantown, in the county of Monongalia, State of West Virginia, have invented new and useful Improvements in Apparatus for Pressing Glass, of which the following is a specification, reference being had to the accompanying drawings, in which—

Figure 3:
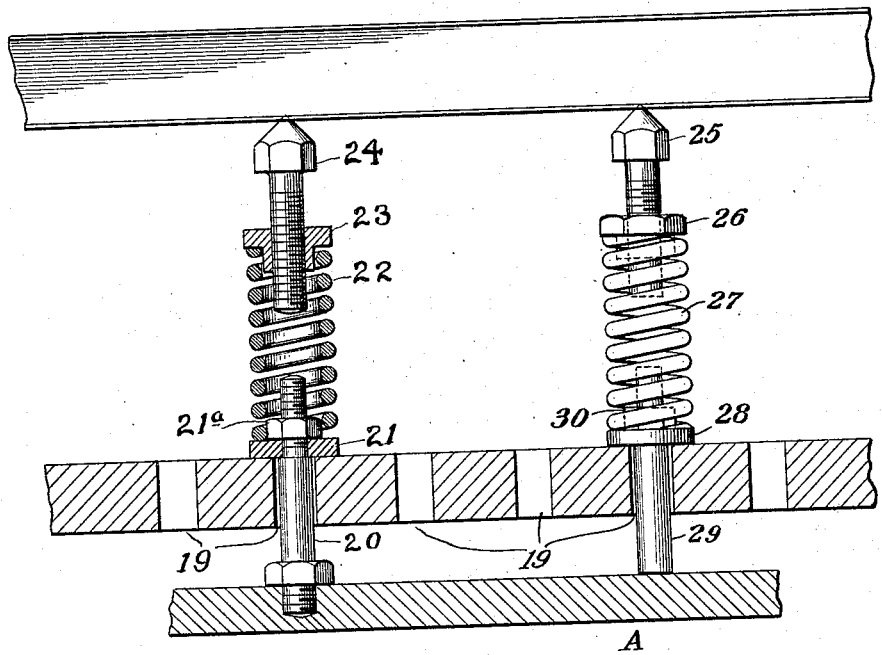
Figure 4:
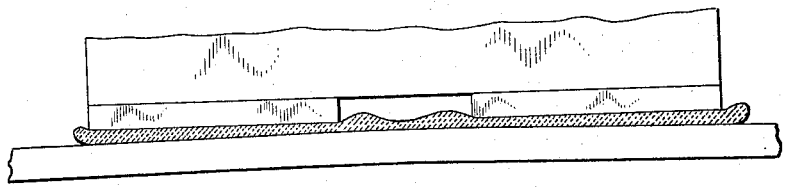
Figure 5:
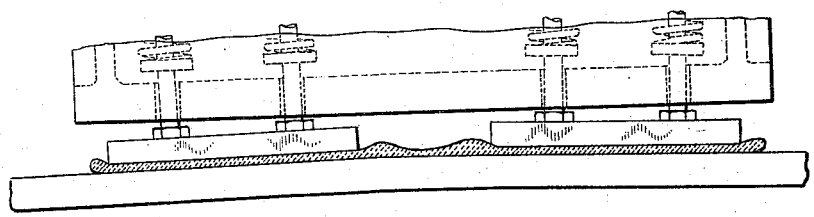

Figure 1 shows a plan view of the pressing portion of a glass making machine, equipped with my improvement; Fig. 2 is a side view of the apparatus shown in Fig. 1, partly in section; Fig. 3 is a detail view of the spring control of the individual dies; Fig. 4 is a view illustrative of the defects which I overcome by my invention; and Fig. 5 is a view similar to Fig. 4, showing the manner in which my invention overcomes the said defects.

My invention relates primarily to an improvement in apparatus for making glass, applicable to such a machine as is shown in United States Patent 661,024, to Ripley and Wadsworth, in which the glass is first rolled on a flat table, and then is brought into contact with dies by which the surface of the flat sheet of glass is pressed into some special form. By my invention I aim to provide means whereby a number of small dies may be advantageously used in connection with a single flat table, so that a number of pieces of relatively small size may be pressed simultaneously.

As is now well known in the glass making art, when a sheet of molten glass is spread on a casting table, the heat of the glass transmitted to the casting table causes the latter to bow up at the center, so that if a flat sheet of glass of large dimensions is brought against a flat die, the sheet of glass produced will be appreciably thinner at the center than at the margins. For this reason it has been suggested that in pressing large sheets the table should be made concave, so that when expanded by the heat of the glass it will be practically flat, or that the die be concave, so that its surface will be substantially parallel to the surface of the molten glass at the time the pressing operation is commenced.

When pressing small sheets of glass individually, the bowing of the table is not great enough to cause any serious difficulty. If, however, small sheets are pressed simultaneously, with the use of a single casting table, and the dies are so arranged as to lie in a plane, I have found that the curvature of the large sheet of glass on the casting table will be just as troublesome as if one large sheet were being pressed, as in Fig. 4 of the drawings. By my invention I aim to provide means whereby each of the small individual dies will adjust itself so that it will be substantially parallel to the mean surface of the glass which is to be pressed by it. That is, I make a large press, in which a number of pieces of glass may be produced by a single operation, which is as effective as the combination of many small presses, and I accomplish this without providing any means for causing the surface of each die to be substantially parallel to the actual surface of the glass which is to be pressed.

Referring now to the drawings in which a preferred form of my invention is shown, 2 represents a frame, which carries the pressing apparatus; 3 a casting table, which is adapted to move into the position shown in Fig. 2, after a plate of glass has been rolled on it as described in the Ripley and Wadsworth Patent 661,024. The vertical movement of the casting table 3 is controlled by the cylinder 4, operating through the piston 5, the arm 6, and the plungers 7. Positioned above the casting table 3 is a backing plate 8, having upwardly extending sides 9, adapted to receive two or more I-beams as 10 and 11. These I-beams may be moved into various positions in the backing plate 9, and are held in position by means of bolts 12, for which holes 13 are provided in the sides 9 of the backing plate 8. If desired, the backing plate 8 may be strengthened by webs 14. Extending laterally from the backing plate 8 are lugs 15, through which pass rods 16, which are screwed into the frame 2. The rods 16 carry the backing plate 8 and are provided with collars 16ª which limit the downward movement of the backing plate 8 toward the frame 2. The backing plate 8 is, however, free to move away from the frame 2, subject to the compression of the springs 17, which encircle the rod 16, and which are held in place and may be adjusted by means of the nuts 18.

In the face of the backing plate 8, are provided a number of holes 19, by means of which dies of various shapes and sizes may be attached to the backing plate 8. In my invention as illustrated I show the apparatus equipped with three sets of dies, which are designated by the letters A, B and C, the dies A and B being quite small, whereas the die C takes up about half of the surface of the apparatus. In attaching the various dies to the backing plate each die is provided with two or more bolts 20, which are screwed into the die. On the top of each bolt 20 a ring 21 is screwed, by means of the nut 21ª. The bolts 20 are free to move in the holes 19. In the application of the dies to the machine that is shown in the drawings, the dies A and B are each provided with two bolts 20, whereas the die C, being of much larger dimensions, is provided with four bolts 20. Pressing against the rings 21 are springs 22. The upper ends of the springs 22 press against rings 23, which screw onto bolts 24. The bolts 24 are adapted to press against the I-beams 10 and 11, which, as shown, are to be positioned in appropriate holes 13 in the sides 9.

To set up the complete press, dies as A, B and C are attached to the backing plate 8 by the bolts 20, and the nuts 21ª are screwed down until the faces of all of the dies lie in a common plane. The springs 22 are then put in place with the rings 23 and the bolts 24. Above the bolts 24 are placed the necessary I-beams as 10 and 11, which are fastened to the sides 9 by bolts 12. The bolts 24 are then tightened until the springs 24 which are near the margin of the backing plate are under a substantial pressure, and those nearer the center are under a less pressure. The correct adjustment of these springs can readily be obtained from an observation of a few trial sheets of glass. When a proper degree of tension is obtained on the springs 24, the dies A, B and C will adjust themselves to follow the mean surface of the glass with which they are brought in contact, as shown in Fig. 5. In operating the press, when an equal pressure has been exerted on all of the springs 22, this pressure will be transmitted to the I-beams 10, and through the sides 9 and the backing plate 8 to the springs 17, which I provide to prevent any breakage of the parts in case the sheet of glass is, as a whole, rolled too thick.

In Fig. 3 is shown an auxiliary means for adjusting the pressure on any of the dies that may be used on the apparatus. This consists of a bolt 25, provided with a collar 26, which are respectively similar to the bolt 24 and the collar 23. In contact with the collar 26 is a spring 27, and the lower end of the spring 27 contacts with a collar 28, carried on a rod 29. The rod 29 is provided with a nut 30, which holds the collar 28 in place, and at its lower end is adapted to contact with a die as A. It is apparent that as the rod 29 is not screwed into the die A as many of these additional pressing devices as may be necessary can be quickly inserted back of any portion of the die.

Many variations may be made in the form of apparatus without departing from the spirit of my invention, since what I claim is:

1. In a glass pressing apparatus the combination of a backing plate, a plurality of dies flexibly mounted on said backing plate, and cushioning means adapted to control the planes of the said dies in relation to the said backing plate.

2. In a glass pressing apparatus the combination of a backing plate, a plurality of dies flexibly mounted on said backing plate, means for applying yielding pressures at various points on said dies to control the planes of the said dies in relation to the said backing plate, and means for adjusting the degrees of the said pressures.

3. In a machine for pressing a plurality of glass articles simultaneously, the combination of a casting table, a backing plate movable in relation to said casting table and adapted to carry a plurality of dies, a plurality of dies flexibly mounted on said backing plate, yielding means for controlling the planes for said dies, and means for bringing the said dies and said casting table in pressing relation.

MYRON A. ROSS.

Witnesses:
B. M. STEMPLE,
G. R. CREEL.

Copies of this patent may be obtained for five cents each, by addressing the "Commissioner of Patents, Washington, D. C."